United States Patent [19]
Yamanaka

[11] Patent Number: 5,894,368
[45] Date of Patent: Apr. 13, 1999

[54] OPTICAL PRISM

[75] Inventor: Mutsuhiro Yamanaka, Yao, Japan

[73] Assignee: Minolta Co., Ltd., Osaka, Japan

[21] Appl. No.: 08/731,227

[22] Filed: Oct. 11, 1996

[30] Foreign Application Priority Data

Oct. 13, 1995 [JP] Japan ................................. 7-265399

[51] Int. Cl.⁶ ........................... G02B 27/10; G02B 5/04
[52] U.S. Cl. ........................... 359/638; 359/834; 348/337
[58] Field of Search ................................ 359/638, 639, 359/640, 636, 831, 833, 834, 837, 900; 348/337, 338

[56] References Cited

U.S. PATENT DOCUMENTS

| 3,870,398 | 3/1975 | Love | 359/833 |
| 4,309,108 | 1/1982 | Siebert | 359/638 |
| 4,560,457 | 12/1985 | Ogawa | 522/11 |

FOREIGN PATENT DOCUMENTS 5-232305  10/1993  Japan.

Primary Examiner—Jon W. Henry
Attorney, Agent, or Firm—McDermott, Will & Emery

[57] ABSTRACT

An optical prism having a first glass member which has a first surface on which an specific light is irradiated, a second surface which reflects a part of the specific light and passes through the rest of the specific light, and a third surface on which the part of the specific light reflected by the second surface is irradiated in a substantially vertical direction; and a second glass member which has a fourth surface which passes through the rest of the specific light passing through the second surface, and a fifth surface on which the rest of the specific light passing through the forth surface is irradiated in a substantially vertical direction; wherein the third surface and the fifth surface have a resin which hardens by being irradiated the specific light.

19 Claims, 4 Drawing Sheets

OPTICAL PRISM

BACKGROUND OF THE INVENTION

1. Field of the Invention

The present invention pertains to an optical prism that is combined with multiple image sensing elements employed in an image sensing device such as a camera or scanner.

2. Description of the Related Art

Image sensing devices in which an optical prism is combined with multiple image sensing elements have conventionally been proposed. In recent years, because it is advantageous in reducing both harmful light and the number of components, as well as in achieving compactness and light weight, part of the housings of the image sensing elements are glued to the optical prism on its image forming light exit surfaces using a resin, etc., that hardens under UV light, such that the image sensing elements and the optical prism are combined.

FIG. 5 is a rough sketch of an area where an image sensing element is attached in a conventional image sensing device. 10 is an optical prism, and 4 is a housing containing an image sensing element. Housing 4 is connected to surface 10a from which image forming light rays exit toward the image sensing element. A method in which the length of the optical path regarding the image sensing element and the optical prism is adjusted while the image sensing element is combined with the optical prism is disclosed in Japanese Laid-Open Patent Hei 5-232305.

FIG. 6 is a side elevational view of the important parts of an image sensing device using this method to explain the method to adjust the length of the optical path. The optical prism comprises first glass member 11, second glass member 12 and third glass member 13, and the length of the optical path of the light rays that reach three image sensing elements is adjusted by adjusting the relative positions of these three glass members. 14 is an image sensing lens that is attached to the optical prism by means of attaching member 15.

In order to glue the housing, a resin that hardens under UV light is sometimes used because of its ease of use and because work time may be freely set. To harden the resin and affix the image sensing element, it is necessary to irradiate UV light on the adhesion area. In the configuration shown in FIG. 6 in which an image sensing lens is combined with an optical prism, it would be difficult for UV light to be irradiated via the incident surface of the optical prism. Where UV light is to be irradiated onto the adhesion area in the configuration shown in FIG. 6, the UV light must be irradiated using a surface other than the surface from which the image forming light rays exit.

As a method to irradiate UV rays using a surface other than the image forming light exit surface, a light guiding member is sometimes added in the vicinity of the adhesion area for the purpose of irradiation of UV light. FIG. 7 is a side elevational view of an optical system to explain one conventional example of this method. 7 is a light guiding member that is affixed beforehand to adhesion surface 4a of the housing. When housing 4 is affixed to optical prism 10, UV light 6 is irradiated via one edge of light guiding member 7, causing the UV light-hardened resin to harden.

When UV light is irradiated under the method shown in FIG. 7, the following problems arise due to the contraction of the resin during the hardening process.

Where UV light is not irradiated evenly over the entire adhesion surface, the hardening of the resin does not proceed evenly and the correct positioning is lost during the hardening process, and due to residual stress, separation or displacement may occur. In addition, where the amount of UV light irradiated on the center part is insufficient, hardening will proceed from the edge to the center part, and as a result there is a danger that boundary surfaces will remain in the vicinity of the center part and that cracking may occur in some cases.

Further, in an image sensing device in which multiple image sensing elements are employed, in order to affix the image sensing elements in positions that are optically equivalent or appropriate in terms of design, positioning along a total of six axes, i.e., positioning along three axes comprising a three-dimensional coordinate system and in terms of the rotation around said three axes, is required.

However, because only changes in the directions along the exit surface is permitted under the method shown in FIG. 5, neither focus adjustment in which the image sensing element is moved in the directions along the optical axis nor angling adjustment in which the image sensing element is tilted relative to the exit surface may be performed. As a result, the image sensing device suffers from image quality deterioration, such as a reduction in resolution or image distortion.

In the conventional example shown in FIG. 6, it is difficult to make complete adjustment along all six axes, and it is unavoidable that the positioning error pertaining to the image sensing elements and the housing will negatively affect the image quality.

Although this negative influence may be mitigated by improving the precision in the combination of the image sensing elements and the housing, among the tilting of the image formation plane and misplaced focus positions pertaining to light rays that should form an image on each of the image sensing elements, those problems caused by the image sensing lens cannot be corrected.

Therefore, in an image sensing device in which a dedicated image sensing lens and an optical prism are affixed to each other, in consideration of the reduction in image quality that occurs due to improper positioning of the image sensing elements and the optical prism, the performance of the image sensing lens must be improved, which increases its size, weight and cost.

SUMMARY OF THE INVENTION

The first object of the present invention is to provide an optical prism that makes proper positioning of image sensing elements with regard to the six axes possible even where a method is employed in which parts of the image sensing element housings are attached to the image forming light exit surfaces of the optical prism.

The second object of the present invention is to realize an optical prism that has a small number of components and that is compatible with a high-precision method of adjusting and affixing image sensing elements.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

1. Embodiments of the Invention

Embodiments of the present invention will be described below with reference to the drawings.

The optical prism of the present invention that is combined with multiple image sensing elements is employed in an image input device requiring high-precision images, such as a video camera or a digital camera, for example.

Figure 1:
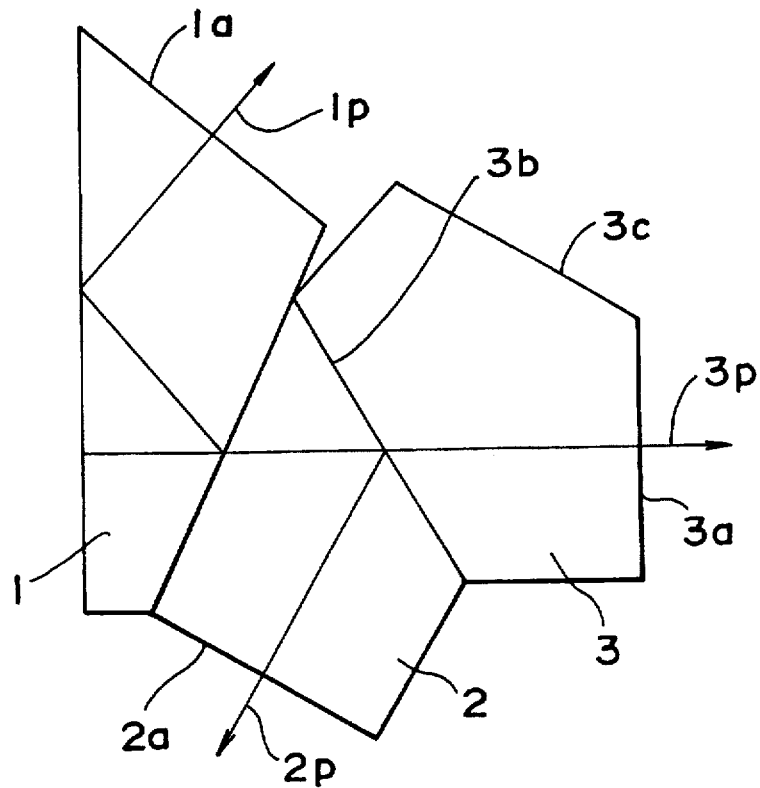
FIG. 1 is a side elevational view of the optical prism pertaining to a first embodiment.

FIG. 1 is a side elevational view of the optical prism pertaining to a first embodiment. 1, 2 and 3 are respectively first, second and third glass members that comprise the optical prism. 1a, 2a and 3a are image forming light exit surfaces of the first, second and third glass members. 1p, 2p and 3p are optical axes of the image forming light rays that exit the first, second and third glass members. 3b is an incident surface that is struck by the image forming light rays that travel from second glass member 2 to third glass member 3. UV light incident surface 3c is adjacent to exit surface 3a but not to incident surface 3b, and is placed for the purpose of UV light irradiation. In this embodiment, UV light incident surface 3c is parallel to image forming light exit surface 2a of the second glass member.

Figure 2:
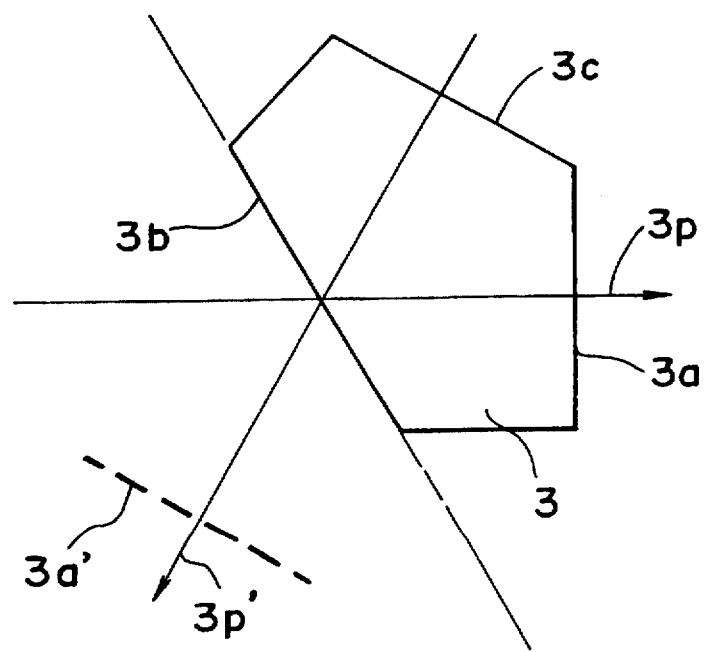
FIG. 2 is a drawing to explain the configuration of the third glass member in the first embodiment.

FIG. 2 is a drawing to explain the configuration of third glass member 3 of the optical prism shown in FIG. 1. 3a' is a mirror image of exit surface 3a with incident surface 3b working as the plane of symmetry. 3p' is similarly a mirror image of optical axis 3p. In third glass member 3, UV light incident surface 3c forms an obtuse angle with exit surface 3a, mirror image 3p' of optical axis 3p with incident surface 3b working as the plane of symmetry intersects with UV light incident surface 3c, and the point of intersection exists within UV light incident surface 3c.

Tracing this positional relationship backward, when light rays are made to strike UV light incident surface 3c such that they will progress along optical axis mirror image 3p' after entering the glass member, the light rays are reflected by incident surface 3b and then reach the point of intersection between exit surface 3a and optical axis 3p in a perpendicular fashion relative to exit surface 3a.

Light rays that progress to exit surface 2a are first reflected by incident surface 3b. Because exit surface 2a is optically at an equal position as exit surface 3a, the light rays that pass through incident surface 3b reach the point of intersection between exit surface 2a and optical axis 2p in a perpendicular fashion relative to exit surface 2a.

Figure 3:
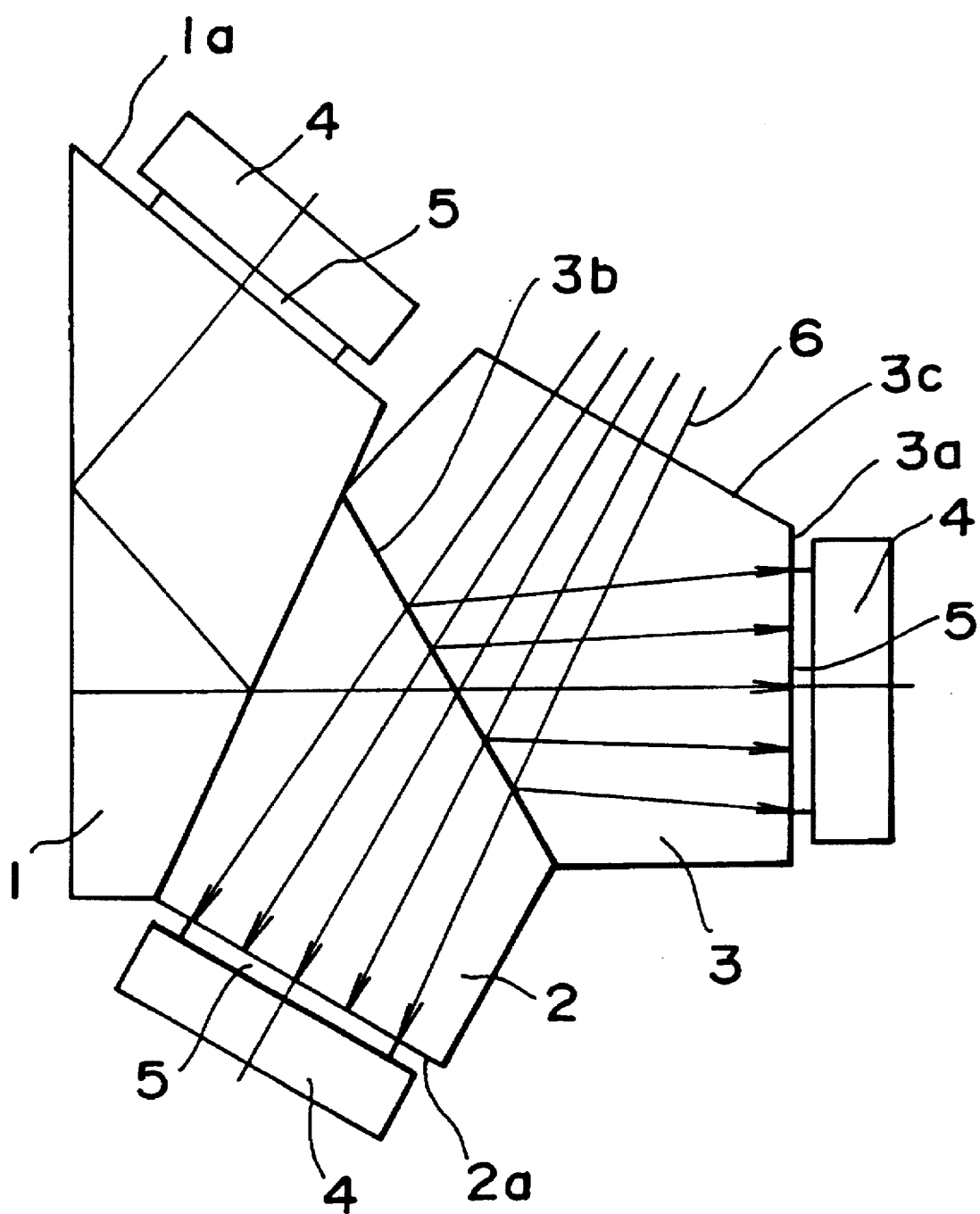
FIG. 3 is a side elevational view of the important parts of an image sensing device employing the optical prism of the first embodiment.

FIG. 3 is a side elevational view of the important parts of an image sensing device employing the optical prism shown in FIG. 1. 4 are housings each containing an image sensing element, and 5 are UV light-hardened resin. Three housings 4 are glued, using the surfaces that face optical prism 1, to exit surfaces 1a, 2a and 3a of the optical prism, respectively, by means of UV light-hardened resin 5. A dichroic filter is attached to incident surface 3b, so that part of UV light rays 6 having a wavelength that hardens UV light-hardened resin 5 will pass through said filter and the rest of UV light rays 6 will be reflected. In this construction, when UV light rays 6 are caused to strike UV light incident surface 3c, they reach both exit surface 2a and exit surface 3a.

Figure 6:
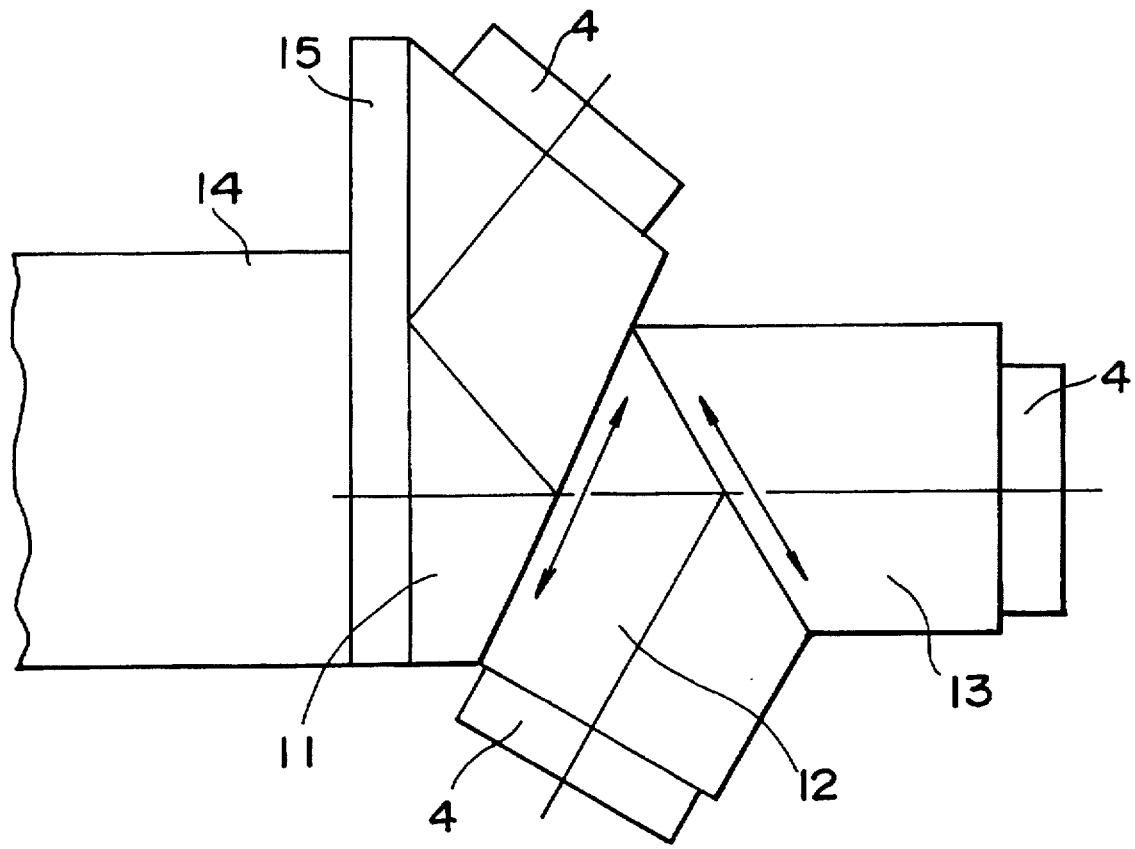
FIG. 6 is a side elevational view of the important parts of a conventional image sensing device.
Figure 7:
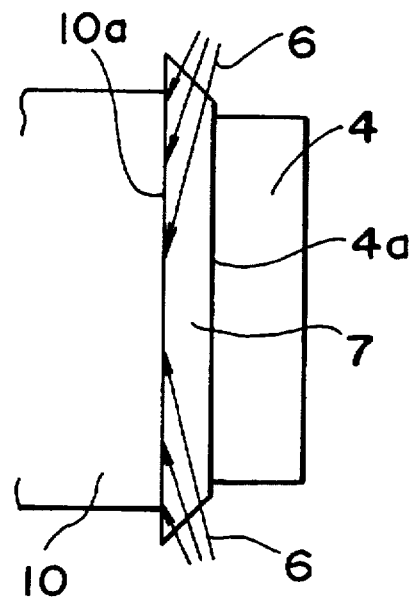
FIG. 7 is a side elevational view of an area where an image sensing element is attached in another conventional image sensing device.

Because in the UV light incident described above, the angle between UV light incident surface 3c and exit surface 3a is an obtuse angle, the exit angle from exit surface 3a is closer to a right angle than in any form of irradiation conceivable in the conventional model shown in FIG. 6, and the UV light that passes through the glass members does not widen significantly as a result of extreme polarization or refraction.

In this embodiment, the exit angle at exit surface 3a is made a right angle by causing UV light to strike UV light incident surface 3c in a perpendicular fashion and by placing UV light incident surface 3c parallel to image forming light exit surface 2a of the second glass member. It is also acceptable for the positional relationship between UV light incident surface 3c and exit surface 2a to be set in a different fashion so long as the widening of the UV light resulting from extreme polarization or refraction of said light passing through the glass members is within the allowable range. Naturally, if the configuration permits, it is more effective to set the angle of UV light incident surface 3c so that the light will enter and exit the glass members in a perpendicular fashion, as in this embodiment.

In addition, if UV light incident surface 3c is polished, while the manufacturing cost increases, the intensity distribution prior to the UV light entering the glass members can be maintained when the UV light enters the glass members, without loss caused by diffusion. Further, regarding the adhesion surfaces, the UV light progresses along the optical axes, and therefore it reaches the exit surfaces in a perpendicular fashion. As a result, uneven hardening of the resin caused by UV light striking the exit surfaces at an angle does not occur.

As described above, since at exit surfaces 2a and 3a, UV light-hardened resin 5 hardens evenly starting from the surfaces that are irradiated by the UV light rays, problems caused by contraction during the hardening process can be minimized.

An optimal UV light incident surface such as UV light incident surface 3c for exit surfaces 2a and 3a cannot be set for exit surface 1a, and unevenness occurs in the intensity distribution of the UV light. As a result, displacement in positioning increases during the hardening process of UV light-hardened resin 5. However, a high-precision affixing of the image sensing elements can be realized by first working with exit surface 1a and then by adjusting the positions of the image sensing elements while working with exit surfaces 2a and 3a.

When UV light incident surface 3c is made a polished surface, the progress of the gluing at exit surfaces 2a and 3a can be visually observed, which makes inspection reliable and easy.

Modifications of this embodiment include a method in which the image sensing device is constructed such that the dichroic filter allows UV light rays 6 that harden UV light-hardened resin 5 to pass through and UV light rays 6 from UV light incident surface 3c are used for the gluing at exit surface 2a only, and a method in which the image sensing device is constructed such that the dichroic filter reflects UV light rays 6 and UV light rays 6 from UV light incident surface 3c are used for the gluing at exit surface 3a only.

Figure 4:
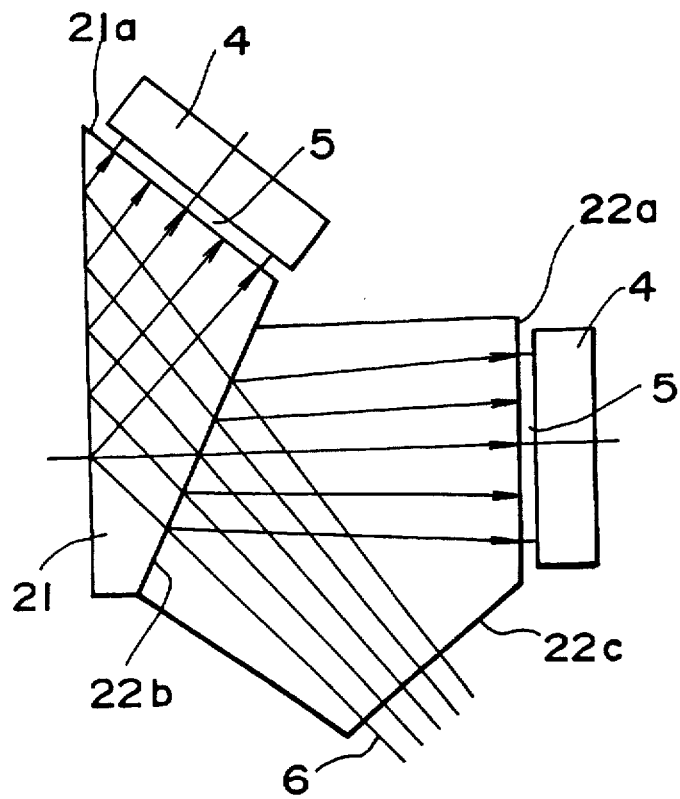
FIG. 4 is a side elevational view of the important parts of an image sensing device employing the optical prism of a second embodiment.
Figure 5:
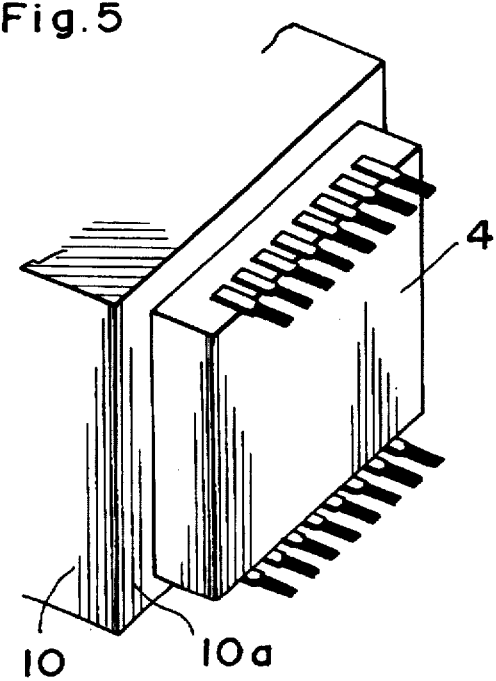
FIG. 5 is a rough sketch of an area where an image sensing element is attached.

FIG. 4 is a side elevational view of an optical prism pertaining to the second embodiment. 21 and 22 are first and second glass members, respectively, that comprise the optical prism. Incident surface 22b of second glass member 22 is constructed such that it allows part of UV light rays 6 to pass through and reflects the rest of said light rays. When UV light rays 6 are caused to strike UV light incident surface 22c, they reach exit surfaces 21a and 22a in a good condition in the same way as in the first embodiment.

The present invention is effective not only where housings of image sensing elements and an optical prism are directly glued together using a UV light-hardened adhesive, but also in all other methods in which optical elements such as image sensing elements are affixed using the hardening of an adhesive material by means of a specific light beam, such as cases where members that work as spacers are inserted and where a material is hardened using an infrared beam.

Using the present invention, when image sensing elements are affixed to an optical prism, even if a method is used in which gaps for the purpose of adjustment with regard to the six axes are maintained between the adhesion surfaces of the housings and the adhesion surfaces of the optical prism, and the housing surfaces and the optical prism surfaces are glued together using a UV light-hardened resin, displacement in positioning during the hardening process can be minimized, and ensuing separation and displacement caused by residual stress can be prevented.

As described above, using the optical prism of the present invention, a compact and lightweight image sensing device that has high image performance can be inexpensively provided, because even though the image sensing unit has a small number of components and is compact, adjustments that sufficiently ensure performance of the optical system can be performed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical prism comprising:
   a first optical member which has
      a first surface on which a specific light is irradiated,
      a second surface which reflects a part of said specific light and passes through the rest of said specific light, and
      a third surface on which the part of said specific light reflected by said second surface is irradiated in a substantially perpendicular direction relative to said third surface; and
   a second optical member which has
      a fourth surface which passes through the rest of said specific light passing through said second surface, and
      a fifth surface on which the rest of said specific light passing through said fourth surface is irradiated in a substantially perpendicular direction relative to said fifth surface;
   wherein said third surface and said fifth surface have resins which harden by being irradiated by said specific light.

2. The optical prism as claimed in claim 1,
wherein said first surface is adjacent to said third surface.

3. The optical prism as claimed in claim 1,
wherein said first surface is not adjacent to said third surface.

4. The optical prism as claimed in claim 2, wherein an adjacent angle between said first surface and said third surface is an obtuse angle.

5. The optical prism as claimed in claim 1, wherein said specific light is an ultra violet light.

6. The optical prism as claimed in claim 1, wherein said specific light is an infrared light.

7. The optical prism as claimed in claim 1, wherein said first surface is a polished surface.

8. The optical prism as claimed in claim 1, wherein said first surface is parallel to said fifth surface.

9. An optical prism comprising:
   a first optical member which has
      a first surface on which a specific light is irradiated,
      a second surface which reflects a part of said specific light and passes through the rest of said specific light, and
      a third surface on which the part of said specific light reflected by said second surface is irradiated in a substantially perpendicular direction relative to said third surface; and
   a second optical member which has
      a fourth surface which passes through the rest of said specific light passing through said second surface, and
      a fifth surface on which the rest of said specific light passing through said fourth surface is irradiated in a substantially perpendicular direction relative to said fifth surface;
   wherein either said third surface or said fifth surface has a resin which hardens by being irradiated by said specific light.

10. The optical prism as claimed in claim 9,
wherein said third surface has the resin which hardens by being irradiated by said specific light.

11. The optical prism as claimed in claim 9,
wherein said fifth surface has the resin which hardens by being irradiated by said specific light.

12. The optical prism as claimed in claim 9,
wherein said first surface is adjacent to said third surface.

13. The optical prism as claimed in claim 9,
wherein said first surface is not adjacent to said third surface.

14. The optical prism as claimed in claim 10,
wherein an adjacent angle between said first surface and said third surface is an obtuse angle.

15. The optical prism as claimed in claim 9,
wherein said specific light is an ultra violet light.

16. The optical prism as claimed in claim 9,
wherein said specific light is an infrared light.

17. The optical prism as claimed in claim 9,
wherein said first surface is a polished surface.

18. The optical prism as claimed in claim 9,
wherein said first surface is parallel to said fifth surface.

19. An optical prism comprising:
   a first optical member which has
      a first surface on which a specific light is irradiated,
      a second surface which reflects a part of said specific light and passes through the rest of said specific light, and
      a third surface on which the part of said specific light reflected by said second surface is irradiated in a substantially perpendicular direction relative to said third surface; and
   a second optical member which has a fourth surface which passes through the rest of said specific light passing through said second surface, and a fifth surface on which the rest of said specific light passing through said fourth surface is irradiated in a substantially perpendicular direction relative to said fifth surface;

wherein an adjacent angle between said second surface and said third surface is an obtuse angle, wherein said third surface intersects with a mirror image of an optical axis with said first surface working as a plane of symmetry, and wherein either said third surface or said fifth surface has a resin which hardens by being irradiated by said specific light.

* * * * *